United States Patent
Chen et al.

(10) Patent No.: US 12,536,966 B2
(45) Date of Patent: Jan. 27, 2026

(54) DISPLAY DEVICE AND BACKLIGHT CONTROL METHOD THEREOF

(71) Applicant: AUO Display Plus Corporation, Hsinchu (TW)

(72) Inventors: Po-Kun Chen, Hsinchu (TW); Ying-Han Lee, Hsinchu (TW); yueh-Han Chung, Hsinchu (TW); Ren-Wei Huang, Hsinchu (TW)

(73) Assignee: AUO Display Plus Corporation, Hsinchu (TW)

( * ) Notice: Subject to any disclaimer, the term of this patent is extended or adjusted under 35 U.S.C. 154(b) by 0 days.

(21) Appl. No.: 19/002,748

(22) Filed: Dec. 27, 2024

(65) Prior Publication Data

US 2025/0174207 A1 May 29, 2025

(30) Foreign Application Priority Data

Dec. 5, 2024 (TW) ................ 113147318

(51) Int. Cl.
*G09G 3/36* (2006.01)
*G09G 3/32* (2016.01)
*G09G 3/34* (2006.01)

(52) U.S. Cl.
CPC ............ *G09G 3/3426* (2013.01); *G09G 3/32* (2013.01); *G09G 2310/08* (2013.01); *G09G 2320/0252* (2013.01); *G09G 2320/0626* (2013.01)

(58) Field of Classification Search
CPC .... G09G 3/3426; G09G 3/32; G09G 2310/08; G09G 2320/0252; G09G 2320/0626; G09G 3/342
USPC ..................................... 345/99, 102
See application file for complete search history.

(56) References Cited

U.S. PATENT DOCUMENTS

| | | | |
|---|---|---|---|
| 2007/0002003 A1* | 1/2007 | Kim ............ | G09G 3/342 345/102 |
| 2010/0007682 A1* | 1/2010 | Kwon .......... | G09G 3/3426 345/99 |

\* cited by examiner

*Primary Examiner* — Abdul-Samad A Adediran

(57) ABSTRACT

The present invention provides a display device and its backlight control method. The display device includes a display panel, a backlight module, and a timing control unit. The display panel has a plurality of scan lines, and the backlight module has a plurality of light-emitting units. These light-emitting units are divided into a first backlight area and a second backlight area along the scanning direction of one of the scan lines. The backlight control method includes the steps of obtaining a backlight luminance data by the timing control unit, outputting a first backlight area control signal to the backlight driving unit by the timing control unit to control the luminance of the first backlight area, and outputting a second backlight area control signal to the backlight driving unit by the timing control unit to control the luminance of the second backlight area.

9 Claims, 5 Drawing Sheets

DISPLAY DEVICE AND BACKLIGHT CONTROL METHOD THEREOF

FIELD OF THE INVENTION

The present invention relates to a display device and a backlight control method thereof.

BACKGROUND OF THE INVENTION

The technological development of light emitting diodes (LEDs), from initial solid-state lighting to backlight sources in the display field to LED display devices, provides a solid foundation for the wide application thereof. With the development of chip manufacturing and packaging technologies, the backlight sources using mini-LEDs and even micro LEDs are also rapidly developed, and thus the backlight sources can achieve finer local dimming display.

Reference is made to FIG. 1. A traditional display 10 includes a display panel 110, a backlight module 120 and a timing controller 130. The display panel 110 and the backlight module 120 are disposed opposite to each other. To perform local dimming, the backlight module 120 includes a plurality of parallel backlight areas, taking backlight areas A01-A06 as an example here. Besides, the backlight module 120 further includes a first backlight driving board 121 and a second backlight driving board 122, which receive backlight driving signals from the timing controller 130 to drive LEDs corresponding to the backlight areas A01-A06. Furthermore, the first backlight driving board 121 includes three driving chips 121A-121C, and the second backlight driving board 122 also includes three driving chips 122A-122C. The driving chip 121A drives the backlight area A01 to emit light, and so on. Besides, the driving chip 122A drives the backlight area A04 to emit light, and so on.

Light-emitting units corresponding to the backlight areas A01-A06 are driven sequentially, the timing controller 130 outputs a backlight driving signal D01 to the driving chip 121A of the first backlight driving board 121 to drive the LED corresponding to the backlight area A01, then the driving signal D01 is transmitted to the driving chip 121B and the driving chip 121C in sequence, and next, the driving signal D01 is transmitted back to the timing controller 130 and then is transmitted to the driving chip 122A, the driving chip 122B and the driving chip 122C of the second backlight driving board 122 in sequence.

In the traditional backlight driving manner matched with a liquid crystal driving manner, backlight control needing to cooperate with an image frame for display must be sequentially transmitted from the first LED to the last LED within a complete image frame time, and then complete lighting can be achieved. In other words, the traditional method is implemented on the basis of a complete frame, and the computing time for each frame is about 40 milliseconds. Thus, the hardware delay is long due to one-by-one transmission of the LEDs, a long time is needed from generation of the signal to display, and due to the long delay, the real-time response speed of a system cannot meet some applications with high standard requirements, for example, surgery. Thus, providing a display device and a backlight control method thereof to effectively solve the above problems is actually one of the important issues at present.

SUMMARY OF THE INVENTION

The present invention provides a display device and a backlight control method thereof to improve the delay during display of the display device, thereby further improving the response time and display quality of a display image.

To achieve the above purpose, the present invention provides a backlight control method for a display device. The display device includes a display panel, a backlight module, and a timing control unit. The display panel includes a plurality of scan lines, the backlight module includes a plurality of light-emitting units, and the light-emitting units are divided into a first backlight area and a second backlight area along a scanning direction of one of the scan lines. The backlight control method includes the following steps: obtaining backlight luminance data by the timing control unit; outputting a first backlight area control signal to a backlight driving unit by the timing control unit to control the luminance of the first backlight area; and outputting a second backlight area control signal to a backlight driving unit by the timing control unit to control the luminance of the second backlight area.

In an embodiment of the present invention, the first backlight area control signal is transmitted to the backlight driving unit through a first serial peripheral interface, and the second backlight area control signal is transmitted to the backlight driving unit through a second serial peripheral interface.

In an embodiment of the present invention, the first backlight area control signal and the second backlight area control signal are simultaneously output through the first serial peripheral interface and the second serial peripheral interface.

In an embodiment of the present invention, the first backlight area control signal and the second backlight area control signal are simultaneously output through the first serial peripheral interface and the second serial peripheral interface by means of a synchronizing signal, a multi-thread or a hardware interruption source.

In an embodiment of the present invention, in the first backlight area or the second backlight area, the corresponding light-emitting units are driven in a progressive scanning manner.

In an embodiment of the present invention, the light-emitting units are driven in the progressive scanning manner from top to bottom or from bottom to top.

On the other hand, to achieve the above purpose, the present invention provides a display device, including a display module, a backlight module, and a driving module. The display module includes a display panel, where the display panel includes a plurality of scan lines. The backlight module is disposed opposite to the display panel and includes a plurality of light-emitting units, where the light-emitting units are divided into a first backlight area and a second backlight area along a scanning direction of one of the scan lines. The driving module is electrically connected to the display module and the backlight module respectively and includes a timing control unit. The timing control unit outputs a first backlight area control signal through a first serial peripheral interface to control the luminance of the first backlight area and outputs a second backlight area control signal through a second serial peripheral interface to control the luminance of the second backlight area.

In an embodiment of the present invention, the driving module further includes a driving unit electrically connected to the timing control unit. The driving unit includes a first backlight driving unit and a second backlight driving unit. The first backlight driving unit is electrically connected between the first serial peripheral interface and the first backlight area so as to transmit the first backlight area control signal. The second backlight driving unit is electrically connected between the second serial peripheral interface and the second backlight area so as to transmit the second backlight area control signal.

As stated above, according to the display device and the backlight control method thereof in the present invention, the number of the serial peripheral interfaces of the timing control unit is increased, and the backlight areas of the backlight module are divided along the scanning directions of the scan lines of the display panel. Thus, the time for driving each backlight area can be shortened, and through cooperation with actions of the display panel, the delay time for backlight control corresponding to each image frame can be shortened.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
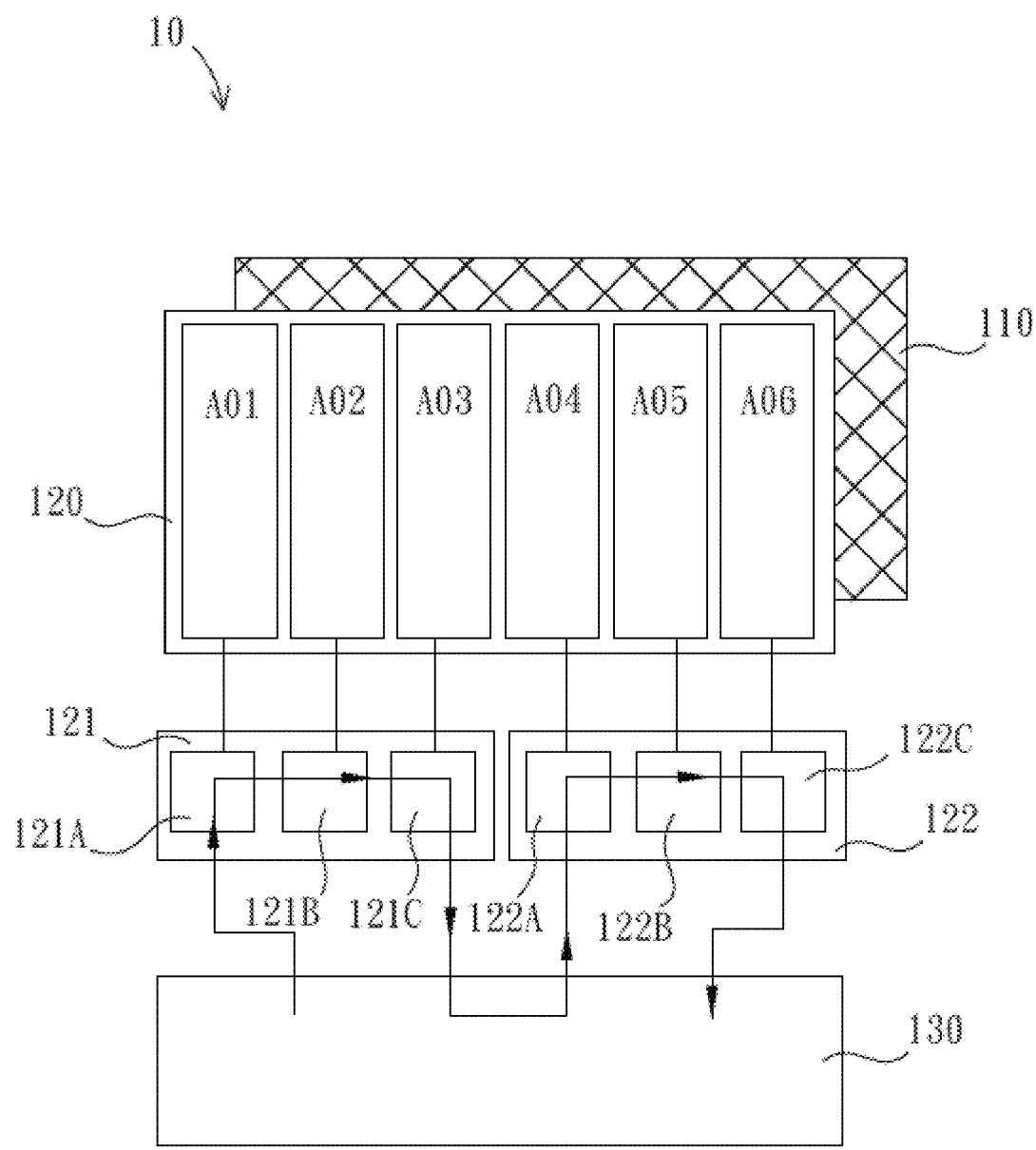
FIG. 1 shows a structural schematic diagram of a known display.
Figure 2:
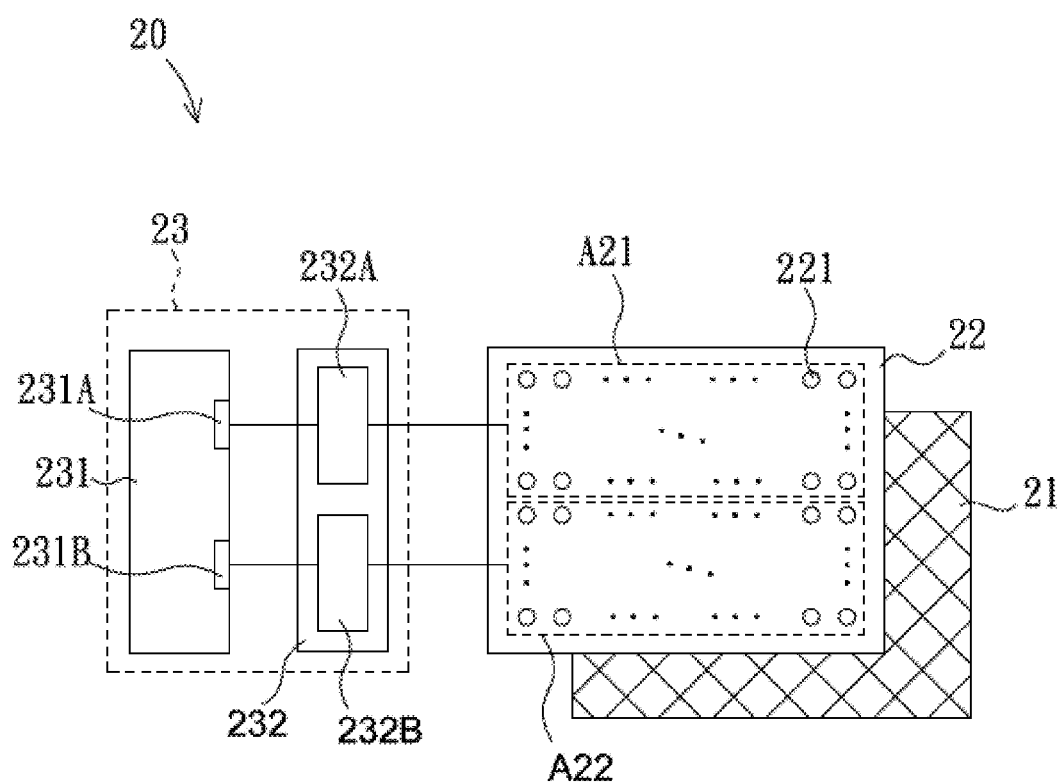
FIG. 2 shows a structural schematic diagram of a display device according to a preferred embodiment of the present invention.

Reference is made to FIG. 2. A display device 20 in a preferred embodiment of the present invention includes a display module 21, a backlight module 22, and a driving module 23. The driving module 23 is electrically connected to the display module 21 and the backlight module 22 respectively and drives same.

Figure 3:
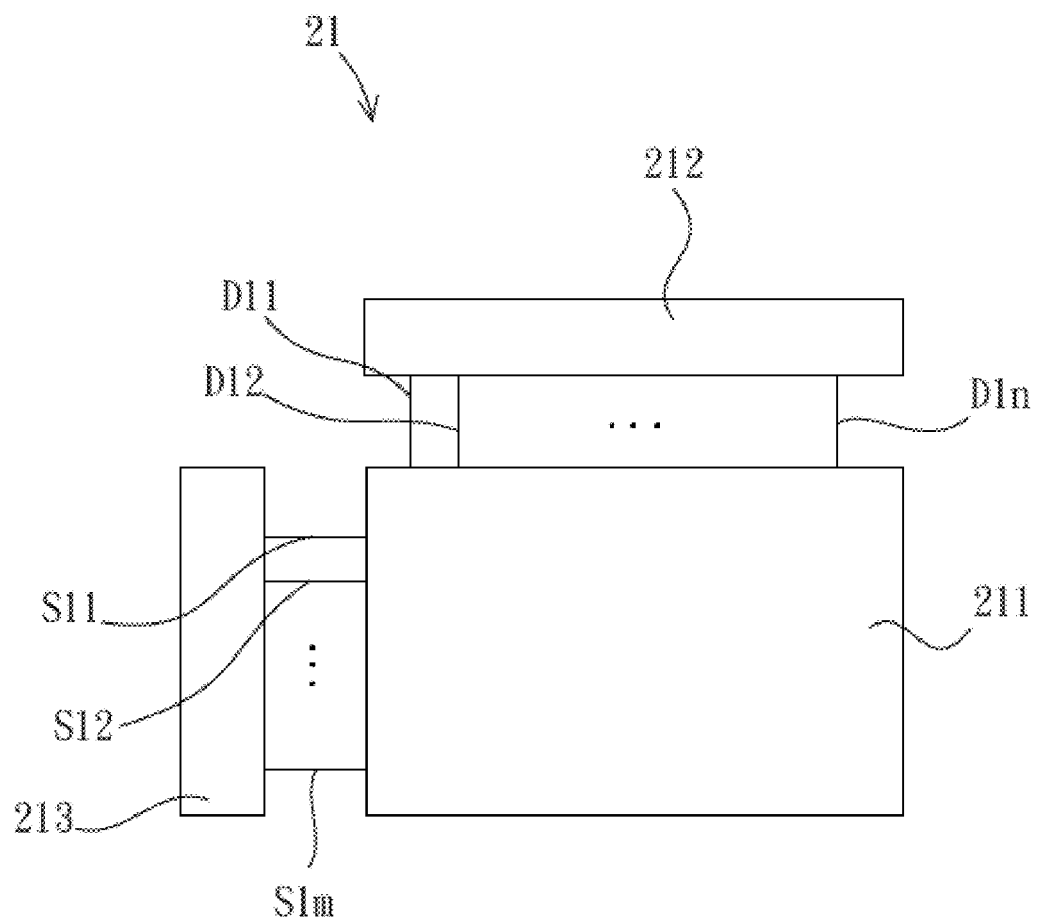
FIG. 3 shows a schematic diagram of a display module according to a preferred embodiment of the present invention.

As shown in FIG. 3, the display module 21 includes a display panel 211, a data driving circuit 212, and a scanning driving circuit 213. The data driving circuit 212 is electrically connected to the display panel 211 by means of a plurality of data lines D11-D1$n$, and the scanning driving circuit 213 is electrically connected to the display panel 211 by means of a plurality of scan lines S11-S1$m$. The display panel 211 in this embodiment is a liquid crystal display panel. The display module 21 writes signals corresponding to pixels into corresponding liquid crystal driving assemblies through the scanning driving circuit 213 and the data driving circuit 212 according to image frame data.

Reference is made to FIG. 2 and FIG. 3 at the same time. The backlight module 22 can emit light which passes through the display panel 211 of the display module 21, so that the display panel 211 can display an image. The backlight module 22 can include a plurality of light-emitting units 221 arranged in an array, for example, including but not limited to light-emitting diodes (LEDs), organic light-emitting diodes (OLEDs), mini light-emitting diodes (mini-LEDs) or micro light-emitting diodes (micro-LEDs). The mini-LEDs are taken as an example in this embodiment. The array type arrangement means that the light-emitting units 221 are arranged and combined in rows and columns, and is not limited to aligned arrangement or staggered arrangement. Besides, the light-emitting units 221 arranged in an array are divided into multiple groups, and each group forms a backlight area. In this embodiment, for example, the light-emitting units 221 are divided into a first backlight area A21 and a second backlight area A22.

The driving module 23 includes a timing control unit 231 and a driving unit 232. The timing control unit 231 includes a first serial peripheral interface (SPI) 231A and a second serial peripheral interface 231B. The driving unit 232 includes a first backlight driving unit 232A and a second backlight driving unit 232B respectively corresponding to the first backlight area A21 and the second backlight area A22. The first backlight driving unit 232A is electrically connected to the first serial peripheral interface 231A and the light-emitting units 221 in the first backlight area A21 respectively, and the second backlight driving unit 232B is electrically connected to the second serial peripheral interface 231B and the light-emitting units 221 in the second backlight area A22 respectively.

In an exemplary embodiment, the backlight module 22 performs a local dimming procedure according to the Gamma value (for example, Gamma 2.2) of the display device 20. The local dimming procedure includes independently adjusting the light-emitting luminance of each light-emitting unit 221 by the backlight module 22 according to the luminance of each portion of the display image. Thus, the luminance of the corresponding light-emitting unit 221 can be reduced when a dark image is displayed, thereby increasing the depth of the black color; and the luminance of the corresponding light-emitting unit 221 can be increased when a bright image is displayed, thereby increasing the luminance of the image. The local dimming procedure can use an AmLED technology, and an active matrix driving circuit is used to control turning-on and turning-off of each mini-LED, or perform accurate luminance control on each area. In other words, the local dimming procedure is executed to compensate for gamma, and in different display areas, the Gamma value is maintained at 2.2 by adjusting the backlight luminance.

Figure 4:
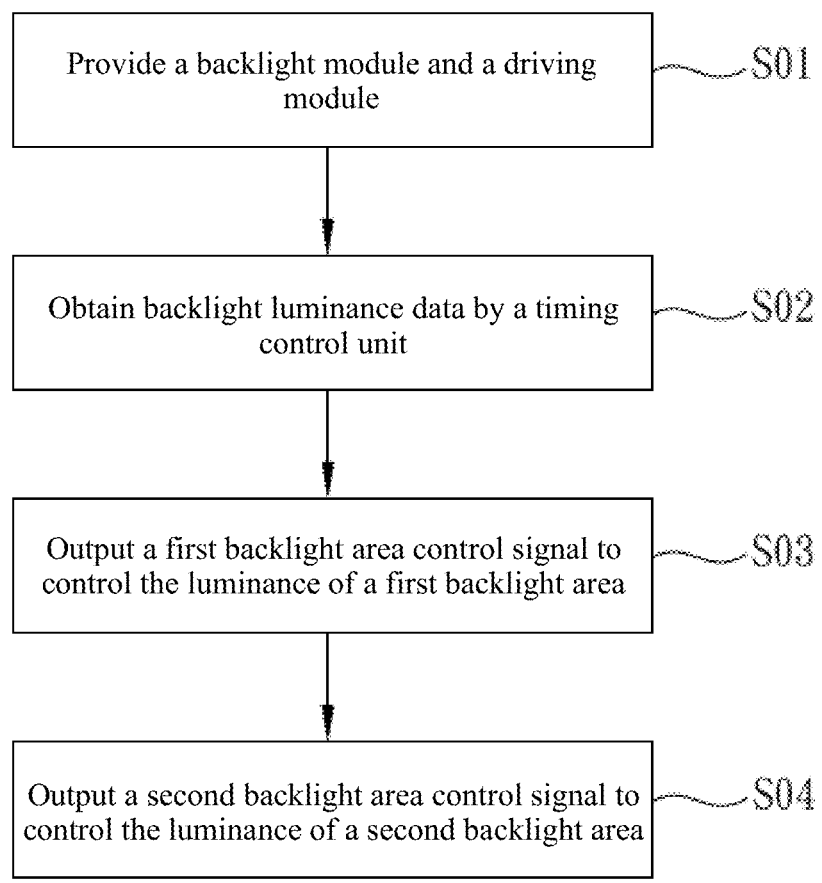
FIG. 4 shows a flow diagram of a backlight control method according to a preferred embodiment of the present invention.

Reference is made to FIG. 2 and FIG. 4, so as to illustrate a backlight control method for the display device according to the preferred embodiment of the present invention. The backlight control method for the display device 20 includes step S01 to step S04.

In step S01, the backlight module 22 and the driving module 23 electrically connected to each other are provided. The corresponding connection relationship of the backlight module 22, the driving module 23 and the display module 21 is as stated above. It is worth mentioning that division of the backlight areas in the backlight module 22 is related to the scanning directions of the display panel 211. In other words, the scanning driving circuit 213 of the display module 21 is electrically connected to the display panel 211 by means of the scan lines S11-S1$m$, and then the backlight areas are divided in the arrangement direction of the scan lines S11-S1$m$. For example, the scan lines are arranged in a horizontal direction, and then the first backlight area A21 and the second backlight area A22 are also divided in the horizontal direction.

In step S02, backlight luminance data is obtained by the timing control unit 231 of the driving module 23. The backlight luminance data includes luminance values of all light-emitting units 221, and can also include the driving signal magnitude required by each light-emitting unit 221.

In step S03, the timing control unit 231 outputs a first backlight area control signal to the first backlight driving unit 232A through the first serial peripheral interface 231A to control the luminance of the first backlight area A21. In this embodiment, the first backlight area control signal begins to provide a corresponding driving signal from the first light-emitting unit 221 in the first row of the first backlight area A21 in a progressive driving manner in the direction of the scan lines.

In step S04, the timing control unit 231 outputs a second backlight area control signal to the second backlight driving unit 232B through the second serial peripheral interface 231B to control the luminance of the second backlight area A22. In this embodiment, the second backlight area control signal begins to provide a corresponding driving signal from the first light-emitting unit 221 in the first row of the second backlight area A22 in a progressive driving manner in the direction of the scan lines.

It is worth mentioning that step S03 and step S04 can be executed at the same time. In other words, the first backlight area control signal and the second backlight area control signal can be substantially synchronously output to the first backlight area A21 and the second backlight area A22 respectively. Thus, the time for controlling each backlight area can be shortened, the delay time can be shortened, and then the present invention can be applied in application fields having particular requirements for high-speed response time, for example, the medical field, particularly to highly real-time and low-delay endoscopy surgery. It should be noted that the substantial synchronization concept includes the situation of the asynchronous output due to the signal transmission delay.

On the other hand, step S03 and step S04 can be executed at the same time in manners such as, but not limited to synchronizing signals, multi-threads or hardware interruption. With regard to the synchronizing signal manner, the timing control unit 231 generates the synchronizing signals and transmits same to the first serial peripheral interface 231A and the second serial peripheral interface 231B, thereby ensuring that backlight luminance adjustment of the two areas is started at the same time. Besides, with regard to the multi-thread manner, two independent threads can be started by a multi-core processor or the timing control unit 231 and are respectively responsible for driving of the first backlight area A21 and the second backlight area A22, thereby ensuring that backlight luminance adjustment of the two areas is started at the same time. Finally, with regard to the hardware interruption manner, for example, a hardware interruption source can be provided, and when the interruption occurs, driving of the first backlight area A21 and driving of the second backlight area A22 are triggered at the same time, thereby ensuring that backlight luminance adjustment of the two areas is started at the same time. The hardware interruption source, for example, triggers interruption signals through a timer.

Figure 5:
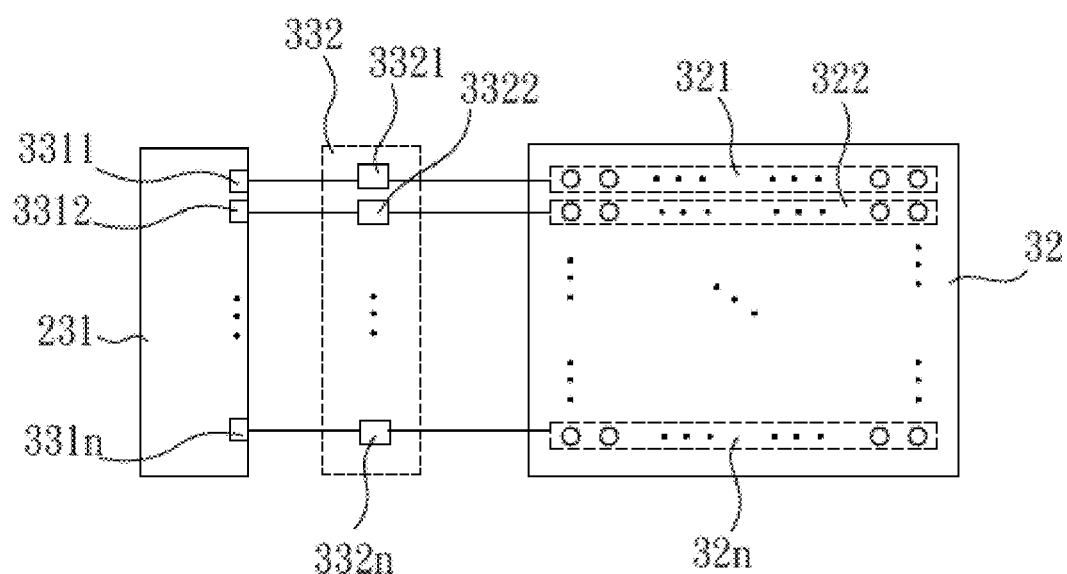
FIG. 5 shows a schematic diagram of another display device in the present invention.

In an exemplary embodiment, one backlight area can be formed by a row of light-emitting units, and the number of the serial peripheral interfaces can directly correspond to the number of rows of the light-emitting units. That is, one serial peripheral interface corresponds to one light-emitting unit arranged in a single row. As shown in FIG. 5, the timing control unit 331 includes n serial peripheral interfaces 3311-331n, the driving unit 332 includes n backlight driving units 3321-332n, and the backlight module 32 includes n backlight areas A31-A3n. The backlight driving units 3321-332n are electrically connected to the corresponding serial peripheral interfaces 3311-331n and the corresponding backlight areas A31-A3n respectively. Thus, the display device can greatly shorten the delay time, but the corresponding manners and numbers are only exemplary. The present invention aims to increase the number of the serial peripheral interfaces that can control the backlight areas at the same time and enable the backlight areas to be consistent with the scanning directions of the scan lines.

Through the above description, according to the display device and a backlight compensation method in the present invention, the luminance can be effectively compensated under different window opening rates and gray levels to enhance the area comparison, reduce the halo effect and maintain the stable gamma value and high luminance of the display device, thereby improving the display quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A backlight control method for a display device, wherein the display device comprises a display panel, a backlight module, and a timing control unit, the display panel comprises a plurality of scan lines, the backlight module comprises a plurality of light-emitting units, and the light-emitting units are divided into a first backlight area and a second backlight area along a scanning direction of one of the scan lines; and the backlight control method comprises:
   obtaining a backlight luminance data by the timing control unit;
   outputting a first backlight area control signal to a backlight driving unit through a first serial peripheral interface by the timing control unit to control the luminance of the first backlight area; and
   outputting a second backlight area control signal to the backlight driving unit through a second serial peripheral interface by the timing control unit to control the luminance of the second backlight area.

2. The backlight control method according to claim 1, wherein the first backlight area control signal and the second backlight area control signal are simultaneously output through the first serial peripheral interface and the second serial peripheral interface.

3. The backlight control method according to claim 2, wherein the first backlight area control signal and the second backlight area control signal are simultaneously output through the first serial peripheral interface and the second serial peripheral interface via a synchronizing signal, a multi-thread, or a hardware interruption source.

4. The backlight control method according to claim 1, wherein in the first backlight area or the second backlight area, the corresponding light-emitting units are driven in a progressive scanning manner.

5. The backlight control method according to claim 4, wherein the light-emitting units are driven in the progressive scanning manner from top to bottom or from bottom to top.

6. A display device, comprising:
   a display module which comprises a display panel, wherein the display panel comprises a plurality of scan lines;
   a backlight module which is disposed opposite to the display panel and comprises a plurality of light-emitting units, wherein the light-emitting units are divided into a first backlight area and a second backlight area along a scanning direction of one of the scan lines; and a driving module which is electrically connected to the display module and the backlight module respectively and comprises a timing control unit, wherein the timing control unit outputs a first backlight area control signal through a first serial peripheral interface to control the luminance of the first backlight area and outputs a second backlight area control signal through a second serial peripheral interface to control the luminance of the second backlight area.

7. The display device according to claim 6, wherein the driving module further comprises a driving unit electrically connected to the timing control unit; the driving unit comprises:

a first backlight driving unit which is electrically connected between the first serial peripheral interface and the first backlight area; and a second backlight driving unit which is electrically connected between the second serial peripheral interface and the second backlight area; and the first backlight area control signal is transmitted to the backlight driving unit through the first serial peripheral interface, and the second backlight area control signal is transmitted to the backlight driving unit through the second serial peripheral interface.

8. The display device according to claim 6, wherein the first backlight area control signal and the second backlight area control signal are simultaneously output through the first serial peripheral interface and the second serial peripheral interface.

9. The display device according to claim 8, wherein the first backlight area control signal and the second backlight area control signal are simultaneously output through the first serial peripheral interface and the second serial peripheral interface by means of a synchronizing signal, a multi-thread or a hardware interruption source.

* * * * *